G. V. CHELSTROM.
INDICATING CALIPER ATTACHMENT.
APPLICATION FILED JAN. 3, 1920.
1,382,061.
Patented June 21, 1921.
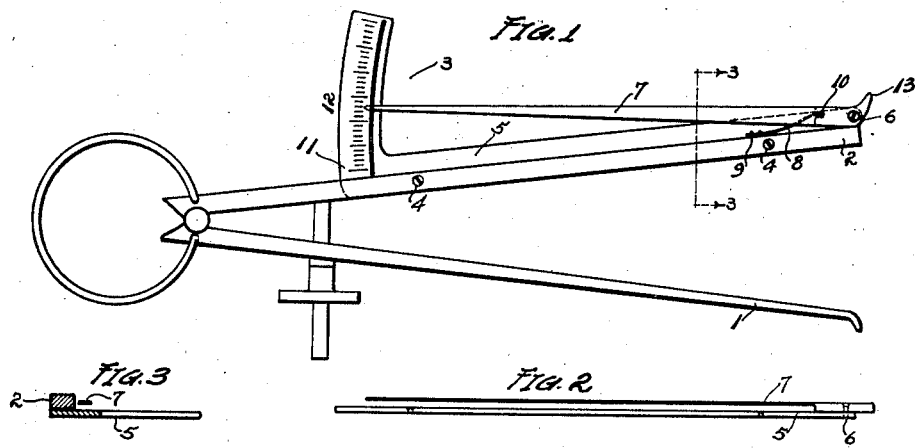

UNITED STATES PATENT OFFICE.

GUST V. CHELSTROM, OF MINNEAPOLIS, MINNESOTA.

INDICATING CALIPER ATTACHMENT.

1,382,061.  Specification of Letters Patent.  Patented June 21, 1921.

Application filed January 3, 1920. Serial No. 349,304.

*To all whom it may concern:*

Be it known that I, GUST V. CHELSTROM, a citizen of the United States, and a resident of Minneapolis, in the county of Hennepin and State of Minnesota, have invented certain new and useful Improvements in Indicating Caliper Attachments, of which the following is a specification.

One object of my invention is to provide in a caliper an improved frame and indicator so that diameters measured by the caliper may be readily checked to minute fractions of an inch.

Another object is to provide in an indicating means for calipers an attachment that can readily be fixed to calipers of ordinary style.

With these and incidental objects in view, the invention consists of certain novel features of construction and combination of parts, the essential elements of which are hereinafter described with reference to the drawing which accompanies and forms a part of this specification.

In the drawing, Figure 1 is a plan view of a pair of calipers embodying my invention; Fig. 2 is a side view of the attachment itself; Fig. 3 is a section taken on the line 3—3, Fig. 1; and Fig. 4 is a plan view of one leg of a pair of outside calipers embodying my invention.

As shown in Fig. 1, the inside calipers have one leg 1 of ordinary style, while the other leg 2 is wider and of uniform width throughout at least the greater portion of its length.

The attachment 3 is fastened to this leg by screws or rivets 4 and the attachment comprises the base 5 to which is hinged at 6 an indicating pointer 7.

A spring 8 attached to the base at 9 and to the indicating leg at 10 serves to normally hold the pointer to the zero mark at 11.

It is evident that when the calipers are inserted in an aperture to be measured the pointer 7 will swing along the arc 12 which has indicating marks thereon, thereby giving a reading of the diameter being measured, and the reading indicated will be a multiplication of the variations of the diameters in the ratio of the length of the pointer from the point 6 to the indicating marks, to that of the short leg of the pointer from the hinged point 6 to the lip 13.

When the device is used with outside calipers the leg 2' of the calipers has the base 5' attached thereto by screws 4' and the pointer 7' is hinged at 6' to the base 5', the spring 8' connecting the pointer with the base.

The arc segment 12' carries indicating marks thereon and the pointer is shaped to conform to the general outline of the leg 2', the center of the arc 12' being the hinge point 6' of the pointer.

It is apparent that while the indicating calipers as a whole are best adapted for the embodiment of my invention, the base and pointer, as shown in Fig. 2, may be readily attached to the legs of any common caliper, thereby making an attachment for the commercial calipers that can readily be placed on the calipers by any ordinary mechanic.

While I have described my invention and illustrated it in two particular designs, I do not wish it understood that I limit myself to these constructions, as it is evident that the application of the invention may be varied in many ways within the scope of the following claims.

Claims:

1. An attachment for calipers comprising in combination a base adapted to be attached to a caliper leg, a graduated arc shaped extension from said base and in the plane thereof, a bell crank shaped pointer hinged to said base at the opposite end from said arc shaped extension, the legs of said bell crank being of different lengths, one leg of said pointer movable as an indicator over the graduated extension and the other serving as a contact member for the calipers, a spring connecting said base and said pointer.

2. In a graduated attachment for calipers the combination of a base adapted to be fastened to one leg of an outside caliper, an arc shaped extension at one end of said base, a pointer hinged to the other end of said base and extending from its hinged point toward said arc shaped extension but along the general contour of said base, one end of said pointer being positioned radially from said hinged point, and adapted to move over the indicating marks on said arc shaped extension, the opposite end of said pointer having a short lip serving as a contact point.

GUST V. CHELSTROM.